(12) United States Patent
Ballauf

(10) Patent No.: US 9,985,498 B2
(45) Date of Patent: May 29, 2018

(54) DEVICE INCLUDING AN ELECTRIC MACHINE WITH A LIGHTWEIGHT DESIGN

(71) Applicant: Christian Ballauf, München (DE)

(72) Inventor: Christian Ballauf, München (DE)

(73) Assignee: Siemens Aktiengesellschaft, München (DE)

( * ) Notice: Subject to any disclaimer, the term of this patent is extended or adjusted under 35 U.S.C. 154(b) by 189 days.

(21) Appl. No.: 15/039,409

(22) PCT Filed: Nov. 18, 2014

(86) PCT No.: PCT/EP2014/074896
§ 371 (c)(1),
(2) Date: May 25, 2016

(87) PCT Pub. No.: WO2015/078730
PCT Pub. Date: Jun. 4, 2015

(65) Prior Publication Data
US 2017/0040870 A1    Feb. 9, 2017

(30) Foreign Application Priority Data

Nov. 26, 2013   (EP) .................................. 13194465

(51) Int. Cl.
*H02K 5/00*   (2006.01)
*H02K 7/14*   (2006.01)
(Continued)

(52) U.S. Cl.
CPC .............. *H02K 7/14* (2013.01); *B64C 27/14* (2013.01); *H02K 1/12* (2013.01); *H02K 1/22* (2013.01);
(Continued)

(58) Field of Classification Search
CPC ....... H02K 5/1675; H02K 7/086; H02K 1/187
(Continued)

(56) References Cited

U.S. PATENT DOCUMENTS 4,864,175 A * 9/1989 Rossi .................... H02K 1/2793
                                                         310/156.29
5,654,597 A * 8/1997 Sakashita ........... G11B 19/2009
                                                         310/51
(Continued)

FOREIGN PATENT DOCUMENTS

CA    2475270 C    12/2006
CN    1623266 A    6/2005
(Continued)

OTHER PUBLICATIONS

Chinese Office Action for Chinese Patent Application No. 201480064662.3 dated Sep. 21, 2017.
(Continued)

*Primary Examiner* — Thanh Lam
(74) *Attorney, Agent, or Firm* — Lempia Summerfield Katz LLC

(57) ABSTRACT

An active part (4) of an electric machine (2) is connected to a supporting body (5) via a connecting structure and is fixed relative to the supporting body (5). A rotor (4') of the electric machine interacts electromagnetically with a stator core (4") and is mounted rotatably relative to the stator core (4") so that the rotor (4') is rotatable about an axis of rotation (8). The connecting structure comprises at least one hub (9), a supporting ring (12) and first and second struts (15, 19). The hub (9) surrounds the axis of rotation (8) and extends in the axial direction from an upper hub end (10) to a lower hub end (11). The hub (9) adjoins, with the upper hub end (10), the supporting body (5) and is fastened there to the supporting body (5). The supporting ring (12), on the outer side (13) thereof, adjoins the active part (4) and is connected to the active part (4). The first struts (15) extend in a radial plane (16) radially outwards from the lower hub end (11) to the supporting ring (12). The first struts (15) merge with the hub (9) in a respective radially inner transition region (17) and
(Continued)

with the supporting ring (12) in a respective radially outer transition region (18). The second struts (19) extend from the upper hub end (10) to the supporting ring (12). In relation to the radial plane (16), the radially inner transition region (17) and the radially outer transition region (18) of a respective first strut (15) each form an angle (a) with the axis of rotation (8).

18 Claims, 3 Drawing Sheets

(51) Int. Cl.
    *H02K 1/30*     (2006.01)
    *B64C 27/14*     (2006.01)
    *H02K 1/12*     (2006.01)
    *H02K 1/22*     (2006.01)
    *H02K 7/08*     (2006.01)
    *H02K 9/06*     (2006.01)

(52) U.S. Cl.
    CPC ................ *H02K 1/30* (2013.01); *H02K 5/00* (2013.01); *H02K 7/08* (2013.01); *H02K 9/06* (2013.01); *H02K 2213/03* (2013.01)

(58) Field of Classification Search
    USPC ............................ 310/74, 89, 90, 91, 67 R
    See application file for complete search history.

(56) References Cited

U.S. PATENT DOCUMENTS

| | | |
|---|---|---|
| 6,204,589 B1 | 3/2001 | Cascio |
| 6,455,959 B1 | 9/2002 | Demont et al. |
| 6,492,756 B1 | 12/2002 | Maslov et al. |
| 8,870,114 B2 | 10/2014 | Botti et al. |
| 2002/0003381 A1* | 1/2002 | Nelson ................... F01P 7/048 310/67 R |
| 2002/0145348 A1* | 10/2002 | Anma ................. H02K 1/2786 310/91 |
| 2007/0166147 A1 | 7/2007 | Merswolke et al. |
| 2008/0193275 A1 | 8/2008 | De Filippis et al. |
| 2010/0301712 A1* | 12/2010 | Amutham ............. H02K 7/088 310/68 B |
| 2012/0043844 A1 | 2/2012 | Bailey et al. |
| 2013/0092789 A1 | 4/2013 | Botti et al. |
| 2016/0087491 A1* | 3/2016 | Duhamel ............ H02K 21/222 301/6.5 |

FOREIGN PATENT DOCUMENTS

| | | |
|---|---|---|
| CN | 103053096 A | 4/2013 |
| DE | 19846220 A1 | 4/2000 |
| DE | 102010021025 A1 | 11/2011 |
| DE | 102011089417 A1 | 6/2013 |
| WO | WO0135512 A1 | 5/2001 |

OTHER PUBLICATIONS

Canadian Office Action for related Canadian Application No. 2,931,372 dated Mar. 1, 2017.
European Search Report for related European Application No. 13194465.4 dated Jun. 30, 2014, with English Translation.

* cited by examiner

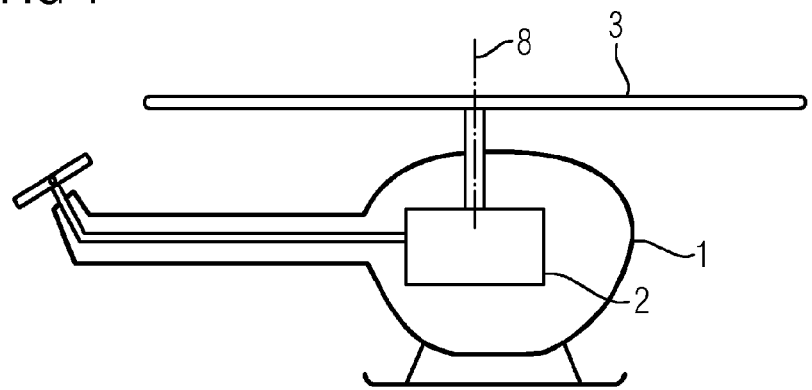
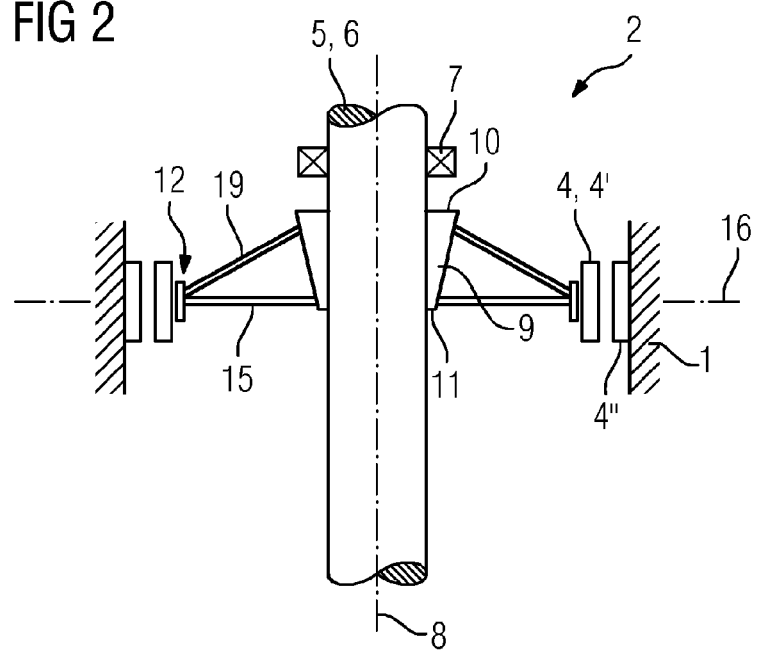

DEVICE INCLUDING AN ELECTRIC MACHINE WITH A LIGHTWEIGHT DESIGN

This application is the National Stage of International Application No. PCT/EP2014/074896, filed Nov. 18, 2014, which claims the benefit of German Patent Application No. EP 13194465.4, filed Nov. 26, 2013. The entire contents of these documents are hereby incorporated herein by reference

BACKGROUND

The present embodiments relate to a device having a support body, where an active part of an electric machine is connected to the support body and is fixed relative to the support body via a connecting structure.

In the context of mobile applications, the power-to-weight ratio of the electric machine plays a major role. For example, it is sought to reduce the weight of the electric machine as far as possible. Weight savings are sought both in the case of the active parts (e.g., electromagnetically active components; magnets and coils and laminations or lamination pack; rotor and stator pack) and in the case of the other components, the passive parts.

If the direct mounting of the active parts is not possible, the torque that acts between the active parts is to be accommodated by a corresponding connecting structure. From the rotor, the torque is to be transmitted, possibly via the connecting structure, to a rotor shaft that is to be driven. From the stator pack, the torque is to be transmitted, possibly via the connecting structure, to a main body of the device.

In the prior art, it is known for the connecting structure to be in the form of a disk or in the form of a spoked structure. In this case, the connecting structure transmits the torque within a radial plane running orthogonally with respect to the axis of rotation. Considerable shear and bending loads arise in the connecting structure. The connecting structure is therefore to be of highly stable and therefore heavy construction.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a device that has an electric machine of lightweight construction and, despite a high torque to be transmitted, makes do with a simple, lightweight connecting structure is provided.

According to one or more of the present embodiments, a connecting structure includes at least a hub, a support ring, first struts, and second struts. The hub surrounds an axis of rotation and extends, as viewed in the direction of the axis of rotation, from an upper hub end to a lower hub end. The hub, via the upper hub end, adjoins the support body and is fastened to the support body. The support ring, at a radially external outer side, adjoins the active part and is connected to the active part. The first struts extend from the lower hub end radially outward to the support ring in a radial plane orthogonal to the axis of rotation. The first struts transition, in a respective radially inner first transition region, into the hub and transition, in a respective radially outer first transition region, into the support ring. The second struts extend from the upper hub end to the support ring. In relation to the radial plane, the radially inner first transition region and the radially outer first transition region of a respective first strut form in each case a first angle with the axis of rotation.

The active part may alternatively be the rotor or the stator pack. Regardless of which of these two cases applies, the configuration according to one or more embodiments of the connecting structure has the effect that the torque between the rotor and stator pack gives rise to substantially only tensile and compressive forces in the connecting structure. By contrast, shear loads and bending loads arise only to a small extent.

In some cases, the direction in which the torque acts between the rotor and stator pack may be known in advance. In this case, depending on the direction of the torque, it may be advantageous if, as viewed about the axis of rotation, the first angles all run clockwise or all run counterclockwise. If the direction of the torque is not known in advance, the first angles may run, in part, clockwise and, in part, counterclockwise, as viewed about the axis of rotation.

The first struts may run in straight fashion within the radial plane. In one embodiment, the first struts may run in curved fashion within the radial plane. This may lead to lower stress loads on the first struts. By contrast, the second struts are, however, configured such that, in a parallel projection of the second struts in the direction of the axis of rotation, the images thereof within the radial plane run in straight fashion.

In one embodiment, the second struts transition, in a respective radially inner second transition region, into the hub and transition, in a respective radially outer second transition region, into the support ring. In relation to the axis of rotation, the radially inner second transition region and the radially outer second transition region of a respective second strut form in each case a second angle with one another. As viewed about the axis of rotation, one of the second struts is also arranged in the region of in each case one of the first struts. The respective second angle of the second strut arranged in the region of the respective first strut is opposite to the respective first angle of the respective first strut.

Via this refinement, forces that tend to effect twisting of the support ring are kept as low as possible.

In one embodiment, the second struts have a second strut width as viewed about the axis of rotation and have a strut height as viewed in the direction of the axis of rotation. The strut height is greater than the second strut width. This refinement leads to increased stability of the second struts in relation to a bending force that acts in the direction of the axis of rotation.

The connecting structure may also include third struts. If the third struts are provided, the third struts extend in the radial plane radially outward from the lower hub end to the support ring, and run purely radially. In tests, this refinement has, for the same total number of struts running in the radial plane, yielded greater stability than a situation in which all of the struts running in the radial plane are in the form of first struts.

In tests, optimum stability has been obtained in that, as viewed about the axis of rotation, in each case either no third struts or at least two of the third struts are arranged in the radial plane between two of the first struts.

As viewed in the radial plane, the first struts have a first strut width and the third struts have a third strut width. However, the third struts are only to accommodate and transmit lower loads than the first struts. Therefore, the third strut width may be smaller than the first strut width. This leads, for an unchanged load capacity of the connecting structure, to a minimization of the weight of the connecting structure.

The connecting structure may also include fourth struts. If the fourth struts are provided, the fourth struts extend from the upper hub end to the support ring. In this case, the fourth struts may be arranged such that, in a parallel projection of the fourth struts into the radial plane in the direction of the axis of rotation, the fourth struts are projected onto the third struts.

In the refinement of the connecting structure, a major part of the torque between rotor and active part is introduced into the hub in the region of the upper hub end. Therefore, for the purposes of obtaining an even more extensive reduction in weight of the connecting structure, the hub, as viewed orthogonally with respect to the axis of rotation, may have a greater wall thickness at the upper hub end than at the lower hub end. Under some circumstances, the wall thickness of the hub at the lower hub end may amount to 10% or less of the wall thickness of the hub at the upper hub end.

The support ring may have a toothing on a radially external outer side of the support ring. In this way, with corresponding design of the active part, positive locking is realized between the active part and the support ring, such that the transmission of the torque from the active part to the support ring is particularly reliable. The connecting structure may be composed of aluminum. This leads to relatively high stability with a relatively low weight.

The connecting structure may be of unipartite form. For example, the connecting structure may be in the form of a cast part. Alternatively, between individual elements, the unipartite nature may be realized via cohesion (e.g., welding or brazing).

In one embodiment, the electric machine may be in the form of an internal-rotor machine. In this case, the active part is in the form of a rotor of the electric machine. In this case, the support body is in the form of a rotor shaft of the electric machine.

Alternatively, the electric machine may be in the form of an external-rotor machine. In this case, the active part is in the form of an active part of the electric machine. In this case, the support body is in the form of a main body of the electric machine.

The device according to one or more of the present embodiments may otherwise be designed as required. For example, in the case of an external-rotor machine, however, an application in the aviation sector may be provided. In this case, the device is an aircraft (e.g., a helicopter).

BRIEF DESCRIPTION OF THE DRAWINGS

FIG. 1 shows one embodiment of a device having an electric machine;

FIGS. 2 and 3 show in each case a longitudinal section through one embodiment of an electric machine;

DETAILED DESCRIPTION

Figure 3:
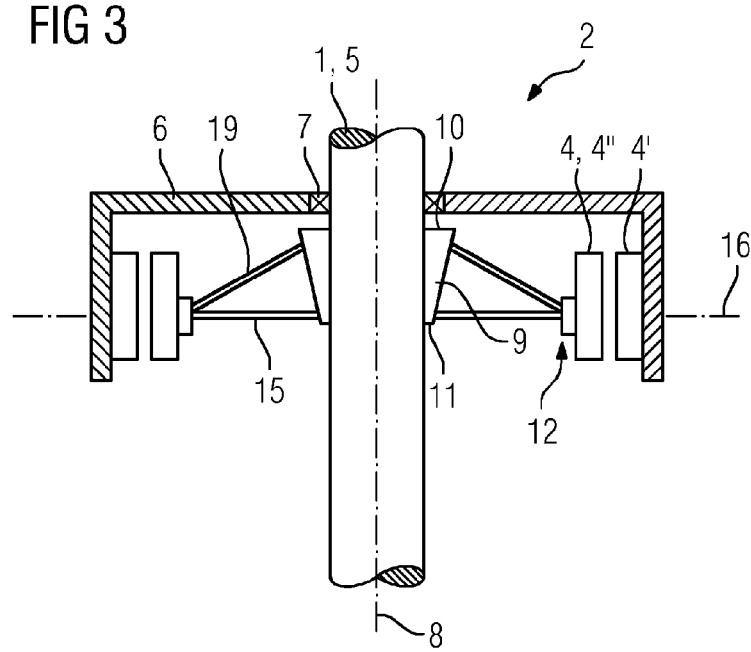

As shown in FIG. 1, a device includes a main body 1. In FIG. 1, the device is an aircraft (e.g., a helicopter). The main body 1 may, for example, be the fuselage of the aircraft. The illustration of FIG. 1 is, however, merely an example. In principle, the main body 1 may be of any desired design.

In the main body 1, an electric machine 2 is arranged. The electric machine 2 drives an assembly 3 of the device. For example, the electric machine 2 may be in the form of a main drive of the device.

In FIG. 2, the electric machine 2 is in the form of an internal-rotor machine. In this case, a first active part 4 of the electric machine 2 is in the form of the rotor 4' of the electric machine. A second active part of the electric machine 2 is, for example, in the form of the stator pack 4" of the electric machine. A support body 5 of the device is in the form of a rotor shaft 6 of the electric machine 2.

In FIG. 3, the electric machine 2 is in the form of an external-rotor machine. In this case, the first active part 4 of the electric machine 2 is in the form of the stator pack 4" of the electric machine 2. The second active part of the electric machine 2 is, for example, in the form of the rotor 4' of the electric machine 2. The support body 5 of the device is, for example, in the form of a main body 1 of the electric machine 2. The rotor 4' electromagnetically interacts with the stator pack 4". The electromotive force is thus generated between the stator pack 4" and the rotor 4'. The rotor 4' is mounted in at least one bearing 7, such that the rotor 4' is rotatable about an axis of rotation 8.

Where the expressions "axial", "radial" and "tangential" are used below, these relate to the axis of rotation 8. Axial is a direction parallel to the axis of rotation 8. Radial is a direction orthogonal to the axis of rotation 8, toward or away from the axis of rotation 8. Tangential is a direction orthogonal to the axis of rotation 8 and orthogonal to the radial direction. Tangential is thus a direction oriented circularly around the axis of rotation 8 at a constant radial distance and in a constant axial position.

In the embodiment of FIG. 3 and the embodiment of FIG. 2, the main body 1 may be a constituent part of the aircraft (e.g., correspondingly to the illustration in FIG. 1, of the helicopter). In the case of an aircraft, the assembly 3 is, for example, in the form of a propeller that generates forward propulsion and/or a lift. In the case of a helicopter, the propeller may be referred to as a rotor. However, the word "rotor" is intentionally avoided in the present case because it is already used in conjunction with the corresponding active part of the electric machine 2.

The following statements apply both to the embodiment of FIG. 2 and to the embodiment of FIG. 3. In conjunction with the further figures, however, only the first active part 4 will be discussed.

Figure 4:
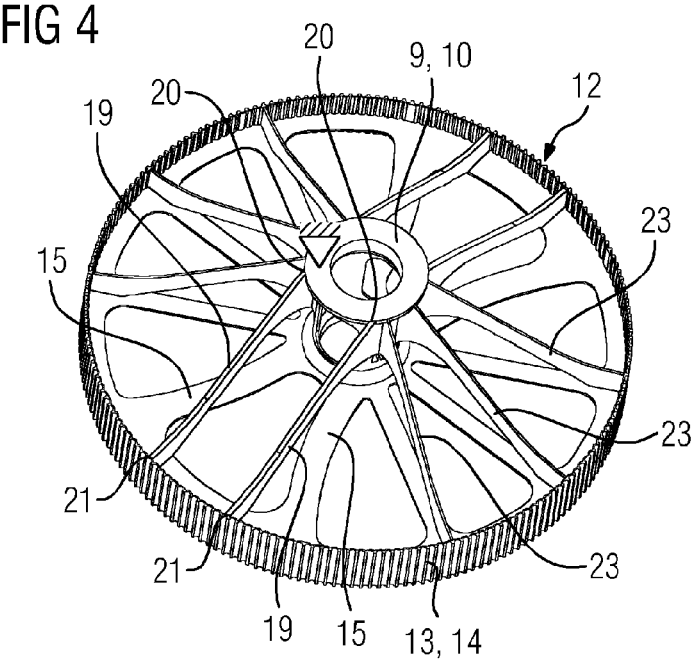
FIG. 4 is a perspective illustration of one embodiment of a connecting structure.
Figure 5:
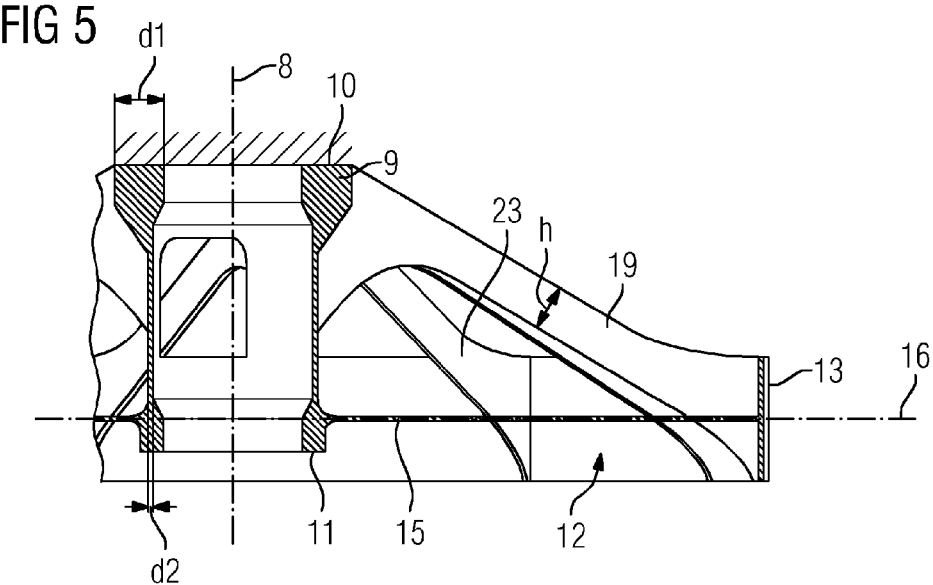
FIG. 5 shows a detail view of a section through one embodiment of the connecting structure of FIG. 4.
Figure 6:
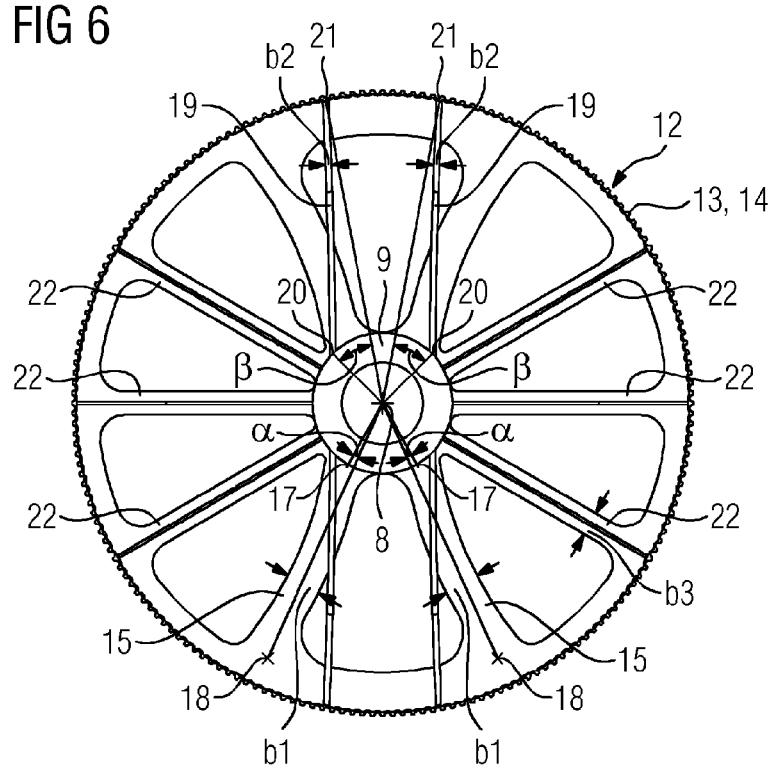
FIG. 6 shows a part of a plan view of one embodiment of the connecting structure of FIG. 4.

The first active part 4 is, both in the embodiment of FIG. 2 and in the embodiment of FIG. 3, connected to the support body 5 and fixed relative to the support body 5 via a connecting structure. In FIGS. 4 to 6, the connecting structure includes a hub 9. The hub 9 surrounds the axis of rotation 8. As viewed in the direction of the axis of rotation 8 (e.g., as viewed in the axial direction), the hub extends from an upper hub end 10 to a lower hub end 11. Via the upper hub end 11, the hub 9 adjoins the support body 5. Via the upper hub end 11, the hub 9 is fastened to the support body 5.

In FIGS. 4 to 6, the connecting structure also includes a support ring 12. The support ring 12, at a radially external outer side 13 of the support ring 12, adjoins the first active part 4. The support ring 12 is connected to the first active part 4. To realize a particularly reliable connection between the support ring 12 and the first active part 4, the support ring 12 may have a toothing 14 on an outer side 13 of the support ring 12.

In FIGS. 4 to 6, the connecting structure also includes first struts 15. The first struts 15 extend in a radial plane 16 that runs orthogonally with respect to the axis of rotation 8. In the radial plane 16, the first struts 15 extend radially outward from the lower hub end 11 to the support ring 12. The first struts 15 transition, in a respective radially inner first transition region 17, into the hub 9. The first struts 15 transition, in a respective radially outer first transition region 18, into the support ring 12. As illustrated with FIG. 6, in relation to the radial plane 16 and, there, in relation to a single one of the first struts 15, the respective radially inner first transition region 17 and the respective radially outer first transition region 18 form in each case a first angle α with the axis of rotation 8. As viewed in the tangential direction, the first angles α are directed in each case from the radially inner first transition region 17 to the respective radially outer first transition region 18. The first struts 15 have a strut width b1 (e.g., first strut width b1). In FIGS. 4 to 6, the connecting structure also includes second struts 19. The second struts 19 also extend to the support ring 12. By contrast to the first struts 15, however, the second struts 19 extend not from the lower hub end 11 but from the upper hub end 10.

FIGS. 4 to 6 show not only a basic embodiment but simultaneously also show several advantageous refinements. The refinements may be realized independently of one another and may be combined with one another as desired in accordance with requirements, if the refinements are not imperatively based on one another.

For example, FIG. 6 shows the refinement whereby the first angles α run, in part, clockwise and, in part, counter-clockwise. This is, however, not imperative. In some cases, the first angles α may all run clockwise or all run counter-clockwise as viewed about the axis of rotation 8.

In one embodiment, corresponding to the illustration in FIG. 6, the first struts 15 run within the radial plane 16 in curved fashion. By contrast, the second struts 19 may be configured such that, in an axially directed parallel projection of the second struts 19, the images thereof within the radial plane 16 run in straight fashion.

Analogously to the first struts 15, the second struts 19 transition, in a respective radially inner second transition region 20, into the hub 9, and transition, in a respective radially outer second transition region 21, into the support ring 12. In a further refinement, analogous to the first struts 15, in relation to the axis of rotation 8, the radially inner second transition region 20 and the radially outer second transition region 21 of a respective second strut 19 form in each case a second angle β with one another. The second angles β are, as viewed in the tangential direction, directed in each case from the radially inner second transition region 20 to the respective radially outer second transition region 21.

As viewed about the axis of rotation 8, one of the second struts 19 is also arranged in the region of in each case one of the first struts 15. There may thus be a 1:1 assignment of in each case one of the second struts 19 to one of the first struts 15. The respective second angle β of the second strut 19 arranged in the region of the respective first strut 15 is, however, opposite to the respective first angle α of the respective first strut 15. Thus, if, with regard to a single one of the first struts 15, the corresponding first angle α runs clockwise (counterclockwise), the second angle β of the second strut 19 arranged in the region of the first strut 15 runs counterclockwise (clockwise).

The second struts 19 have a strut width b2 as viewed about the axis of rotation 8 and have a strut height h as viewed in the direction of the axis of rotation 8. The strut width b2 of the second struts 19 will hereinafter be referred to as second strut width b2. A further embodiment includes (see FIG. 4) that the strut height h is greater than the second strut width b2. The ratio between strut height h and second strut width b2 may, for example, lie between 5:1 and 10:1.

In one embodiment, only the first struts 15 run in the radial plane 16. In a further refinement, however, the connecting structure also includes third struts 22. In this case, the third struts 22 extend, likewise in the radial plane 16, radially outward from the lower hub end 11 to the support ring 12. By contrast to the first struts 15, however, the third struts 22 run purely radially. This is illustrated with FIG. 4 and particularly clearly from FIG. 6. Based on the presence of the third struts 22, further advantageous refinements may be provided.

For example, it may be provided that (see FIG. 4 and FIG. 6), as viewed about the axis of rotation 8, in each case either no third struts 22 or at least two of the third struts 22 are arranged in the radial plane 16 between two of the first struts 15. In FIG. 4, a total of ten struts 15, 22 are arranged in the radial plane 16 (e.g., two groups of in each case two first struts 15, the first angles α of which are oriented in opposite directions, where in each case three third struts 22 are arranged between the two groups).

Analogously to the first struts 15 and the second struts 19, the third struts 22 have a strut width b3 (hereinafter also referred to as third strut width b3). In one embodiment, corresponding to the illustration in FIG. 6, the third strut width b3 is smaller than the first strut width b1. The ratio of the third strut width b3 to the first strut width b1 may, for example, lie between 30% and 70% of the first strut width b1 (e.g., between 40% and 60% of the first strut width b1).

If the third struts 22 are provided, the connecting structure may also include fourth struts 23. In this case, the fourth struts 23 extend from the upper hub end 10 to the support ring 12. The fourth struts 23 run in each case in one axial plane. For example, the fourth struts 23 run in each case above one of the third struts 22. The fourth struts 23 are thus arranged such that, in an axially directed parallel projection into the radial plane 16, the fourth struts are projected onto the third struts 22.

Owing to the construction according to one or more of the present embodiments of the connecting structure, a major part of the forces that act is introduced into the hub 9 at the upper hub end 10. By contrast, an introduction of forces takes place only to a small extent via the lower hub end 11. It is therefore possible, corresponding to the illustration in FIG. 5, for the hub 9, as viewed orthogonally with respect to the axis of rotation 8, to have a large wall thickness d1 at the upper hub end 10 but to have only a small wall thickness d2 at the lower hub end 11. In other words, the hub 9 has a greater wall thickness d1 as viewed orthogonally with respect to the axis of rotation 8 at the upper hub end 10 than at the lower hub end 11.

The ratio of the small wall thickness d2 to the large wall thickness d1 may lie, for example, between 5% and 20% of the large wall thickness d1 (e.g., between 8% and 10% of the large wall thickness d1).

The material of the connecting structure may be configured as required. In some cases, it may, for example, involve fiber-reinforced plastics (e.g., glass fiber-reinforced plastics (GFRP) or carbon fiber-reinforced plastics (CFRP)). In general, the connecting structure is, however, composed of aluminum. In both cases, the connecting structure may be of unipartite form (e.g., in the form of a cast part in the case of aluminum).

The present embodiments have numerous advantages. For example, owing to the three-dimensional, arched form of the connecting structure, the electromagnetic torque is, within the connecting structure, converted into a load state in which virtually exclusively tensile and compressive forces act. In this way, the transmission of the torque from the first active part 4 to the support body 5 is possible via a very lightweight connecting structure.

In summary, the present embodiments thus relate to the following substantive matter.

An active part 4 of an electric machine 2 is connected to a support body 5 and fixed relative to the support body 5 via a connecting structure. A rotor 4' of the electric machine electromagnetically interacts with a stator pack 4" and is mounted so as to be rotatable relative to the stator pack 4", such that the rotor 4' is rotatable about an axis of rotation 8. The connecting structure includes at least a hub 9, a support ring 12, and first and second struts 15, 19. The hub 9 surrounds the axis of rotation 8 and extends in an axial direction from an upper hub end 10 to a lower hub end 11. The hub 9, via the upper hub end 10, adjoins the support body 5 and is fastened there to the support body 5. The support ring 12, at an outer side 13, adjoins the active part 4 and is connected to the active part 4. The first struts 15 extend from the lower hub end 11 radially outward to the support ring 12 in a radial plane 16. The first struts 15 transition, in a respective radially inner transition region 17, into the hub 9 and transition, in a respective radially outer transition region 18, into the support ring 12. The second struts 19 extend from the upper hub end 10 to the support ring 12. In relation to the radial plane 16, the radially inner transition region 17 and the radially outer transition region 18 of a respective first strut 15 form in each case an angle α with the axis of rotation 8.

Even though the invention has been illustrated and described in more detail with reference to the exemplary embodiments, the invention is not restricted by the disclosed examples. Other variations may be derived from these by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device comprising:
   a support body; and
   an electric machine, an active part of the electric machine being connected to the support body and fixed relative to the support body via a connecting structure,
   wherein the electric machine comprises a rotor that electromagnetically interacts with a stator pack and is mounted so as to be rotatable relative to the stator pack, such that the rotor is rotatable about an axis of rotation,
   wherein the connecting structure comprises at least a hub, a support ring, first struts, and second struts,
   wherein the hub surrounds the axis of rotation and extends, as viewed in a direction of the axis of rotation, from an upper hub end to a lower hub end,
   wherein the hub, via the upper hub end, adjoins the support body and is fastened to the support body,
   wherein the support ring, at a radially external outer side, adjoins the active part and is connected to the active part,
   wherein the first struts extend from the lower hub end radially outward to the support ring in a radial plane orthogonal to the axis of rotation,
   wherein the first struts transition, in a respective radially inner first transition region, into the hub and transition, in a respective radially outer first transition region, into the support ring,
   wherein the second struts extend from the upper hub end to the support ring,
   wherein, in relation to the radial plane, the radially inner first transition region and the radially outer first transition region of a respective first strut form in each case a first angle with the axis of rotation.

2. The device of claim 1, wherein, as viewed about the axis of rotation, the first angles all run clockwise, all run counterclockwise, or run, in part, clockwise and, in part, counterclockwise.

3. The device of claim 1, wherein the first struts run in curved fashion within the radial plane.

4. The device of claim 1, wherein the second struts are configured such that, in a parallel projection of the second struts in the direction of the axis of rotation, the images thereof within the radial plane run in straight fashion.

5. The device of claim 1, wherein the second struts transition, in a respective radially inner second transition region, into the hub and transition, in a respective radially outer second transition region, into the support ring,
   wherein in relation to the axis of rotation, the radially inner second transition region and the radially outer second transition region of a respective second strut form in each case a second angle with one another,
   wherein, as viewed about the axis of rotation, in the region of in each case one of the first struts, there is also arranged in each case one of the second struts, and
   wherein the respective second angle of the second strut arranged in the region of the respective first strut is opposite to the respective first angle of the respective first strut.

6. The device of claim 1, wherein the second struts have a second strut width as viewed about the axis of rotation and have a strut height as viewed in the direction of the axis of rotation, and
   wherein the strut height is greater than the second strut width.

7. The device of claim 1, wherein the connecting structure further comprises third struts,
   wherein the third struts extend in the radial plane radially outward from the lower hub end to the support ring, and
   wherein the third struts run purely radially.

8. The device of claim 7, wherein, as viewed about the axis of rotation, in each case, either no third struts or at least two of the third struts are arranged in the radial plane between in each case two of the first struts.

9. The device of claim 7, wherein, as viewed in the radial plane, the first struts have a first strut width and the third struts have a third strut width, and
   wherein the third strut width is smaller than the first strut width.

10. The device of claim 7, wherein the connecting structure further comprises fourth struts, the fourth struts extending from the upper hub end to the support ring, and wherein the fourth struts are arranged such that, in a parallel projection of the fourth struts into the radial plane in the direction of the axis of rotation, the fourth struts are projected onto the third struts.

11. The device of claim 1, wherein the hub, as viewed orthogonally with respect to the axis of rotation, has a greater wall thickness at the upper hub end than at the lower hub end.

12. The device of claim 1, wherein the support ring comprises a toothing on a radially external outer side.

13. The device of claim 1, wherein the connecting structure is composed of aluminum.

14. The device of claim 1, wherein the connecting structure is of unipartite form.

15. The device of claim 1, wherein the electric machine comprises an internal-rotor machine, and wherein the active part comprises a rotor of the electric machine, and wherein the support body comprises a rotor shaft of the electric machine.

16. The device of claim 1, wherein the electric machine comprises an external-rotor machine, wherein the active part comprises a stator pack of the electric machine, and wherein the support body comprises a main body of the electric machine.

17. The device of claim 1, wherein the device is an aircraft.

18. The device of claim 17, wherein the aircraft is a helicopter.

* * * * *